3,218,367
SEPARATION OF OLEFINS FROM HYDRO-
CARBON MIXTURES
Nai Yuen Chen, Sewell, N.J., assignor to Socony Mobil
Oil Company, Inc., a corporation of New York
No Drawing. Filed July 31, 1962, Ser. No. 213,574
12 Claims. (Cl. 260—677)

This invention relates to a process for separating olefins from hydrocarbon mixtures. More particularly, the invention is directed to a method for separating normal olefins from hydrocarbon mixtures by contacting said mixtures with a crystalline aluminosilicate adsorbent to selectively adsorb the straight chain hydrocarbons and thereafter selectively desorb the hydrocarbons other than the normal olefins containing from 5 to 14 carbon atoms.

In the chemical and petroleum industries, there are numerous reactions conducted which provide by-products of straight chain and isomeric hydrocarbons. These hydrocarbons, if separated and isolated, can provide valuable starting materials for the production of useful chemical products. For example, in the production of gasoline, it is desirable to separate the straight chain hydrocarbon components to improve the gasoline quality. In the straight chain hydrocarbon components there are substantial quantities of normal olefins which, if separated and isolated, can be readily used as starting materials in the various chemical processes such as polymer production, and the like. Various methods of separation of these hydrocarbon components are known, but in general, are considered complex, expensive, and, therefore, undesirable for effective use on a large scale and for commercial purposes.

It is the object of the present invention to provide a unique and improved process for separating hydrocarbon components by selective adsorption and desorption. It is a further object to provide a simple and commercially feasible process to separate and recover normal olefins from hydrocarbon mixtures containing the same.

The above and other objects which will be apparent to those skilled in the art are realized in accordance with this invention. Accordingly, the present invention comprises a process for separating normal olefins containing from 5 to 14 carbon atoms from a hydrocarbon mixture containing said olefins and other hydrocarbons by contacting said mixture in the liquid or vapor phase with a crystalline aluminosilicate having uniform pore openings in the range from about 4.5 to about 5.5 Angstrom units. The crystalline aluminosilicates, used herein, adsorb only the straight chain hydrocarbons containing 2 to 14 carbon atoms. After substantial adsorption, the aluminosilicate is contacted with gaseous carbon dioxide at temperatures below about 80° F. Under these conditions, the carbon dioxide gas selectivity desorbs from the aluminosilicate a substantial proportion of the saturated hydrocarbon components containing 2 to 14 carbon atoms and normal olefins containing 2 to 4 carbon atoms but the substantial portion of the normal olefins containing 5 to 14 carbon atoms remains in the aluminosilicate. The isolated normal olefins can be removed from the aluminosilicate, among other methods, by increasing its temperature to about 450° F. or higher under reduced pressure where the aluminosilicate loses its adsorbency and the olefins being removed can be condensed and recovered.

Another feature of this invention relates to a method of treating a normal olefin mixture in the liquid or vapor phase containing from 2 to 14 carbon atoms by contacting said mixture in the presence of a crystalline aluminosilicate having uniform pore openings in the range from about 4.5 to about 5.5 Angstroms units and separating the normal olefins containing 2 to 4 carbon atoms from normal olefins containing from 5 to 14 carbon atoms utilizing the procedure of adsorption and desorption with carbon dioxide described above. An extensive advantage of this separation process is provided by separating the normal olefins containing 2 to 4 carbon atoms at very low temperatures thereby preventing isomerization and/or polymerization that accompanies high temperature desorption.

The process of the invention is broadly applicable to liquid, and/or gaseous hydrocarbon mixtures comprising straight chain hydrocarbons containing from 2 to 14 carbon atoms, i.e. the normal paraffins such as ethane, propane, n-butane, n-pentane, n-octane, n-dodecane, n-tetradecane and the like and normal olefins such as ethylene, propylene, n-butene, n-hexene, n-decene, n-dodecene, n-tetradecene, and the like. In addition to the above-described mixtures, hydrocarbon mixtures in the liquid and/or gaseous state comprising solely normal olefins, containing from 2 to 14 carbon atoms can be used for purposes of separating the n-olefins containing 2 to 4 carbon atoms from the n-olefins containing 5 to 14 carbon atoms. Usually, the hydrocarbon mixtures used herein are of petroleum origin but they may be also derived from coal tar, oil shale or other sources. Also, such mixtures will usually be those whose components are of such a nature that they cannot be efficiently and economically separated by distillation, fractional crystallization, oil absorption, and the like.

The crystalline aluminosilicates which are used in the process of the invention can be prepared according to the general procedure described in U.S. Patent 2,882,243. The crystalline aluminosilicates, used herein, are those having uniform pore openings in the range from about 4.5 to about 5.5 and are frequently referred to as synthetic zeolites. These materials are essentially the dehydrated forms of crystalline hydrous siliceous zeolites containing varying quantities of various alkali metals or other metals and aluminum. The particular metal atoms, silicon, and aluminum in these zeolites are arranged with oxygen in the form of an aluminosilicate salt in a definite and consistent crystalline pattern. The structure contains a large number of small cavities interconnected by a number of still smaller holes or channels. These cavities and channels are precisely uniform in size.

The various types of crystalline aluminosilicates which can be used include the alkali metal aluminosilicates, such as, sodium aluminosilicate, potassium aluminosilicate, and the like, or other metal containing crystalline zeolites which can be prepared by base exchanging the alkali metal aluminosilicates wherein the alkali metal is replaced with a metal ion in cationic state. Such metal ions can include, among others, calcium, magnesium, manganese, vanadium, chromium, cerium, aluminum, lanthanum, praseodymium, other rare earth ions, as well as ammonium ions. Inorganic salts and organic salts of the foregoing metals, such as acetate and formate can be used as well as very dilute or weak acids can be used as the base-exchange solution. It is a requirement, however, for purposes of this invention that the resulting crystalline aluminosilicate contain uniform pore openings in the range from about 4.5 to about 5.5 Angstrom units. The preferred crystalline aluminosilicate to be utilized in this process is the crystalline calcium aluminosilicate which has uniform pore openings of 5 Angstrom units. The optimum particle size of the crystalline aluminosilicate will depend upon the manner in which they are mechanically handled, i.e., as a fixed compact bed, by a moving contact bed or a fluidized bed, and the like, but is usually between 2 and about 100 mesh, preferably, between about 4 and about 30 mesh.

The unique feature of the zeolites, used herein, relates to the selective adsorption of normal hydrocarbons such as normal paraffins and normal olefins containing up to and including 14 carbon atoms per molecule to the exclusion of the other types of hydrocarbons. If the pore size of the zeolite is materially smaller than 4.5 Angstrom units, the pores are too small to adsorb these normal paraffins. If the pores are materially larger, the other types of hydrocarbons will be adsorbed as well as the normal hydrocarbons so that effective separation cannot be obtained. This initial separation is essential in the process of this invention to carry out the further separation step of the normal olefins and the normal paraffins.

The temperature of the crystalline aluminosilicates at which the liquid and/or gaseous hydrocarbons are contacted can range from above the freezing point of the hydrocarbon mixture to temperatures not exceeding 450° F. For reasons of heat economy, it is preferred to conduct the adsorption step over a temperature range which changes from 450° F. to below about 80° F. by passing the liquid and/or gas hydrocarbon mixture through the bed at below about 80° F. If the contact temperature during the adsorption step exceeds about 80° F., an additional step of cooling the aluminosilicate would then be required at the conclusion of the adsorption step. This cooling step can be eliminated if the hydrocarbon mixtures contact with the aluminosilicate is carried out at temperatures below 80° F. Within the temperature range described above, the normal paraffins and normal olefins containing from 2 to 14 carbon atoms will be selectively adsorbed into the aluminosilicate to the substantial exclusion of other types of hydrocarbons, such as cyclics, aromatics, isomeric hydrocarbons, and the like. The pressure which is utilized in the contacting of the hydrocarbon mixtures with the aluminosilicate is not necessarily critical. It is preferred, however, that atmospheric pressure be used but either sub-atmospheric or super-atmospheric pressure may be utilized.

After the crystalline aluminosilicate has been adsorbed with the normal paraffins and normal olefins, gaseous carbon dioxide is passed through the crystalline aluminosilicate at temperatures below about 80° F. and above the freezing point of the hydrocarbon mixtures, preferably in the range from about 40° F. to about 80° F. The carbon dioxide rapidly displaces or selectively desorbs from the aluminosilicate the normal paraffinic hydrocarbons and the normal olefins containing from 2 to 4 carbon atoms. Under these conditions, the normal olefins containing 5 to 14 carbon atoms remain in the aluminosilicate and can be recovered by increasing the temperature of the aluminosilicate to about 450–500° F. under reduced pressure where the alumino-silicate loses its adsorbency. The normal olefins can then be removed, condensed and recovered. The temperature of the carbon dioxide displacement or desorption is critical since it has been discovered that the effectiveness of carbon dioxide as a displacement agent decreases appreciably at temperatures above 80° F. At temperatures higher than 80° F., the desorption selectivity of carbon dioxide cannot be effectively achieved and all of the adsorbed hydrocarbons will slowly desorb unless the temperature exceeds about 450° F. Under these conditions, the normal paraffins and normal olefins cannot be efficiently separated.

A unique embodiment of this separation relates to the selective desorption by carbon dioxide at temperatures below about 80° F. of the normal olefins containing 2 to 4 carbon atoms. If the hydrocarbon mixture contains only normal olefins containing 2 to 14 carbon atoms, the normal olefins such as ethylene, propylene and n-butene can be easily separated and recovered from the normal olefins containing 5 to 14 carbon atoms.

For purposes of this invention, the use of carbon dioxide as the desorbent agent is critical. Carbon dioxide has the unique property which provides for the selective desorption of the normal paraffins at temperatures of 80° F. or below. Gases such as ammonia, sulfur dioxide, hydrogen sulfide, water and the like are known to be strongly adsorbed in the crystalline aluminosilicate but these gases will not provide for the selective desorption of the normal paraffins from the normal olefins.

Only the gaseous form of carbon dioxide can be used in the desorption process of this invention. If the normal paraffins to be desorbed have a sufficiently low vapor pressure which will provide for the removal of the normal paraffins from the aluminosilicate, gaseous carbon dioxide in the pure state or relatively pure state devoid of any contaminants can be utilized. If the vapor pressure of the normal paraffin in the aluminosilicate exceeds the vapor pressure of the gaseous carbon dioxide stream, the desorption of the $C_2$ to $C_{14}$ normal paraffins can be accomplished at temperatures at or below 80° F. by conducting the desorption step in a liquid solvent which is capable of dissolving both the paraffin hydrocarbon and gaseous carbon dioxide whereas the solvent molecules themselves are large enough to be excluded from the aluminosilicate but the carbon dioxide will pass through the pores of the aluminosilicate and selectively desorb the normal paraffins. Under these conditions, the desorbed normal paraffins will be dissolved in the solvent and can be readily separated by known distillation procedures. Examples of suitable solvents include ethanolamine, diethanolamine, triethanolamine, and the like. It should be noted, however, that the gaseous carbon dioxide is providing the selective desorption process whether dissolved in a solvent or solely as a gas.

The crystalline aluminosilicate is preferably employed in the form of a dense compact bed through which the hydrocarbon mixture can be passed, followed by the carbon dioxide displacement and finally removing the normal olefins by increasing the temperature under reduced pressure. In the simplest embodiment of the invention, the crystalline aluminosilicate is employed in the form of a single static bed in which case the process is only semi-continuous. Preferably, a plurality of static beds can be employed with appropriate valving so that the hydrocarbon mixture can be passed through one or more beds while the carbon dioxide can be passed subsequent to the hydrocarbon mixture contact and the heat treatment to recover the normal olefins can all be conducted simultaneously, if desired. The flow of hydrocarbon mixture and carbon dioxide can be continuous either up or down through the aluminosilicate. Any conventional apparatus employed in static bed fluid-solids contacting can be used.

The following examples will serve to illustrate the process of the invention without limiting the same:

Example 1

In an adsorption apparatus employing a McBain helical spring balance, n-hexane was adsorbed on a crystalline calcium aluminosilicate having uniform pore openings of 5 Angstrom units. The aluminosilicate adsorbed 13.0 weight percent n-hexane at 77° F. The adsorbed aluminosilicate was evacuated at a pressure of $10^{-4}$ millimeters mercury for 1 hour at 77° F. removing only 0.9 weight percent of the adsorbed n-hexane. In a similar manner, the crystalline calcium aluminosilicate was adsorbed with n-hexane under the identical conditions as described above. On desorption, carbon dioxide was passed through the system at a temperature of 75° F. and at pressures of 846–856 millimeters mercury, for 32 minutes thereby removing 66.2 weight percent of the adsorbed n-hexane. Desorbing the adsorbed aluminosilicate for a period of 1.1 hours utilizing carbon dioxide under conditions described above, 74.6 weight percent n-hexane was desorbed. Desorbing for additional periods of time all of the n-hexane is expected to be removed from the aluminosilicate. These results indicate the effectiveness of carbon dioxide as a desorbing gas at room temperatures.

Example 2

In an adsorption apparatus employing a McBain helical spring balance, butene-1 was adsorbed in a crystalline calcium aluminosilicate having uniform pore openings of 5 Angstrom units at temperatures of 75° F. On desorption, carbon dioxide was passed through the system at a temperature of 75° F. for 1 hour at pressures of 860 millimeters mercury, removing 66.4 weight percent of the adsorbed butene-1. These results indicate that olefins with 4 carbon atoms can be effectively desorbed under the stated conditions.

*Example 3*

In a similar manner and utilizing the same equipment, as used in Example 2, pentene-1 was adsorbed in the calcium aluminosilicate. After the adsorption was complete, carbon dioxide was passed through the system at a temperature of 75° F. at a pressure of 810–840 millimeters mercury, for 30 and 47 minutes. After 30 minutes, 25.9 weight percent adsorbed pentene-1 was removed, and after 47 minutes, 31.1 weight percent adsorbed pentene-1 was removed from the aluminosilicate. These results indicate that carbon dioxide cannot desorb pentene-1 as effectively as it desorbs butene-1 or n-hexane.

*Example 4*

In a similar manner and utilizing the same equipment, as used in Example 2, hexene-1 was adsorbed in the calcium aluminosilicate. After the adsorption was complete, carbon dioxide was passed through the system at a temperature of 75° F. at a pressure of 860 millimeters mercury, for 30 minutes at 75° F. removing only 25 weight percent of the absorbed hexene-1. This result indicates that olefins containing 6 or more carbon atoms cannot be desorbed effectively by carbon dioxide under these conditions.

*Example 5*

To demonstrate selective desorption, a mixture of n-hexane and hexene-1 was adsorbed in a calcium aluminosilicate having uniform pore openings of 5 Angstrom units in the same apparatus and adsorption conditions described in Example 1. When the adsorption was completed, the adsorbed phase was desorbed at 500° F. at a pressure of $10^{-4}$ millimeters mercury, and condensed in a Dry-Ice acetone bath to be analyzed. In another experiment under the same conditions as above, a mixture of n-hexane and hexene-1 was adsorbed followed by carbon dioxide treatment for 1.3 hours at 75° F. After the system was evacuated to remove the residual vapor in the system, the adsorbed phase was desorbed at 500° F. at a pressure of $10^{-4}$ millimeters mercury, and condensed in a Dry-Ice acetone bath. Both of the above samples were analyzed chromatographically. The ratio of the peak heights of hexene-1 to n-hexane was 2.14 for the adsorbed phase without the carbon dioxide treatment and 5.18 for the adsorbed phase with the carbon dioxide treatment. These results indicate that n-hexane is selectively desorbed by carbon dioxide under the above-described conditions.

*Example 6*

In a similar manner and utilizing the same equipment, as used in Example 2, n-hexane was adsorbed in a calcium aluminosilicate having uniform pore openings of 5 Angstrom units at a temperature of 250° F. The adsorption was followed by treatment with carbon dioxide at 1 atmosphere at 250° F. for 5, 30 and 100 minutes, respectively. The percentage of the adsorbed phase desorbed was found to be 4.7, 9.7 and 14.0, respectively. These results compared with those of Example 1 indicate that the temperature of the carbon dioxide treatment has a specific effect on the mechanism of desorption with carbon dioxide.

*Example 7*

In a similar manner and utilizing the same equipment, as used in Example 2, pentene-1 was adsorbed in a calcium aluminosilicate having uniform pore openings of 5 Angstrom units at a temperature of 150° F. The adsorption was followed by treatment with carbon dioxide at 870 millimeters mercury, pressure and 150° F. for 30 minutes. The percentage of adsorbed pentene-1 desorbed was found to be 18.3. These results compared with Example 3 indicate the increase in temperature from 75° F. to 150° F. in the desorption step decreased the effectiveness of the selectivity of carbon dioxide. Furthermore, these results compared with Example 6 demonstrate the loss of selectivity at higher temperatures.

It is to be understood that the foregoing description is merely illustrative of preferred embodiments of the invention of which many variations may be made by those skilled in the art within the scope of the following claims without departing from the spirit thereof.

What is claimed is:

1. A method for selectively separating normal olefins having from 5 to 14 carbon atoms per molecule from a hydrocarbon mixture containing said olefins and other hydrocarbons including straight chain hydrocarbons containing from 2 to 14 carbon atoms per molecule by means of adsorption and selective desorption, which comprises contacting said hydrocarbon mixture with a crystalline aluminosilicate having uniform pore openings of between about 4.5 and 5.5 Angstrom units, whereby straight chain hydrocarbon components of said mixture including normal olefin components having from 5 to 14 carbon atoms per molecule are adsorbed into the interior of said crystalline aluminosilicate, contacting the crystalline aluminosilicate containing adsorbed hydrocarbons with gaseous carbon dioxide at a temperature below about 80° F., whereby adsorbed hydrocarbons, other than said normal olefins having from 5 to 14 carbon atoms per molecule, are selectively desorbed from said crystalline aluminosilicate and subsequently removing said normal olefins having from 5 to 14 carbon atoms per molecule from said crystalline aluminosilicate.

2. The method of claim 1 wherein said crystalline aluminosilicate has uniform pore openings of about 5 Angstrom units.

3. The method of claim 1 wherein said gaseous carbon dioxide is dissolved in a solvent capable of dissolving said hydrocarbon mixture and carbon dioxide and having molecules large enough to be excluded from the pores of said crystalline aluminosilicate.

4. The method of claim 1 wherein said normal olefins having from 5 to 14 carbon atoms per molecule are removed from said crystalline aluminosilicate by desorption under partial vacuum at a temperature of at least 450° F.

5. A method of selectively separating normal olefins having from 5 to 14 carbon atoms per molecule from a hydrocarbon mixture comprising normal olefins having from 2 to 14 carbon atoms per molecule by adsorption and selective desorption, which comprises contacting said hydrocarbon mixture with a crystalline aluminosilicate having uniform pore openings of between about 4.5 and 5.5 Angstrom units, adsorbing on said crystalline aluminosilicate said normal olefins having from 2 to 14 carbon atoms per molecule, contacting said crystalline aluminosilicate having adsorbed thereon said normal olefins with gaseous carbon dioxide at a temperature below about 80° F., selectively desorbing normal olefins having from 2 to 4 carbon atoms per molecule while selectively retaining adsorbed on said crystalline aluminosilicate said normal olefins having from 5 to 14 carbon atoms per molecule, removing and recovering said normal olefins having from 5 to 14 carbon atoms per molecule from said crystalline aluminosilicate.

6. The method of claim 1 wherein said crystalline aluminosilicate has uniform pore openings of about 5 Angstrom units.

7. The method of claim 1 wherein said gaseous carbon dioxide is dissolved in a solvent capable of dissolving said hydrocarbon mixture and carbon dioxide and having molecules large enough to be excluded from the pores of said crystalline aluminosilicate.

8. The method of claim 1 wherein said normal olefins having from 5 to 14 carbon atoms per molecule are removed from said crystalline aluminosilicate by desorption under partial vacuum at a temperature of at least 450° F.

9. A method for selectively separating normal olefins having from 5 to 14 carbon atoms per molecule from a hydrocarbon mixture comprising normal olefins and normal paraffins having from 2 to 14 carbon atoms per molecule, by means of adsorption and selective desorption, which comprises contacting said hydrocarbon mixture with a crystalline aluminosilicate having uniform pore openings of between about 4.5 and 5.5 Angstrom units, adsorbing on said crystalline aluminosilicate at least part of said normal olefins and said normal paraffins having from 2 to 14 carbon atoms per molecule, contacting a crystalline aluminosilicate with gaseous carbon dioxide at a temperature below about 80° F., selectively desorbing said normal paraffins having from 2 to 14 carbon atoms per molecule and normal olefins having from 2 to 4 carbon atoms per molecule while selectively retaining adsorbed on said crystalline aluminosilicate said normal olefins having from 5 to 14 carbon atoms per molecule from said crystalline aluminosilicate, subsequently removing and recovering said normal olefins having from 5 to 14 carbon atoms per molecule from said crystalline aluminosilicate.

10. The method of claim 9 wherein said crystalline aluminosilicate has uniform pore openings of about 5 Angstrom units.

11. The method of claim 9 wherein said gaseous carbon dioxide is dissolved in a solvent capable of dissolving said hydrocarbon mixture and carbon dioxide and having molecules large enough to be excluded from the pores of said crystalline aluminosilicate.

12. The method of claim 9 wherein said normal olefins having from 5 to 14 carbon atoms per molecule are removed from said crystalline aluminosilicate by desorption under partial vacuum at a temperature of at least 450° F.

References Cited by the Examiner

UNITED STATES PATENTS 2,974,179   3/1961   Fleck. et al.
3,037,338   6/1962   Thomas.

ALPHONSO D. SULLIVAN, *Primary Examiner.*

UNITED STATES PATENT OFFICE
CERTIFICATE OF CORRECTION

Patent No. 3,218,367  
November 16, 1965

Nai Yuen Chen

It is hereby certified that error appears in the above numbered patent requiring correction and that the said Letters Patent should read as corrected below.

Column 6, lines 70 and 73, and column 7, line 3, for the claim reference numeral "1", each occurrence, read -- 5 --.

Signed and sealed this 27th day of September 1966.

(SEAL)  
Attest:

ERNEST W. SWIDER  
Attesting Officer

EDWARD J. BRENNER  
Commissioner of Patents